United States Patent [19]

Lautner et al.

[11] 4,132,913
[45] Jan. 2, 1979

[54] FIELD-COIL BOBBIN WITH BUILT-IN-ONE-SHOT THERMAL PROTECTOR

[75] Inventors: Max E. Lautner; Thomas J. Flint, both of Watertown, N.Y.

[73] Assignee: Gould Inc., Rolling Meadows, Ill.

[21] Appl. No.: 743,705

[22] Filed: Nov. 22, 1976

[51] Int. Cl.² .......................................... H02K 11/00
[52] U.S. Cl. .................................. 310/68 C; 310/43; 310/194; 336/192; 339/95 D
[58] Field of Search ................. 310/68, 68 C, 43, 194, 310/71, 258, 259, 41; 339/95 D; 336/192, 198, 208; 361/41, 25, 26, 27

[56] References Cited

U.S. PATENT DOCUMENTS

| | | | |
|---|---|---|---|
| 2,484,212 | 10/1949 | Ferris | 361/41 |
| 3,200,273 | 8/1965 | Lindt | 361/41 |
| 3,259,864 | 7/1966 | Marzolf | 336/192 |
| 3,275,774 | 9/1966 | Miller | 361/41 |
| 3,405,317 | 10/1968 | Anderson | 361/41 |
| 3,553,621 | 1/1971 | Lane | 336/192 |
| 3,585,450 | 8/1969 | Lane | 310/68 C |
| 3,691,425 | 9/1972 | Weyrich | 361/41 |
| 3,959,675 | 5/1976 | Lautner | 310/68 C |
| 3,963,949 | 6/1976 | Church | 310/43 |
| 3,979,615 | 9/1976 | Neff | 339/95 D |

Primary Examiner—R. Skudy
Attorney, Agent, or Firm—Bruns & Jenney

[57] ABSTRACT

A bobbin for carrying a field coil winding is made of molded plastic resin material having good electrical insulating characteristics and having an insulating channel formed in the hollow spindle portion thereof for carrying a fuse type or one-shot thermal protector. The bobbin flanges are thickened at either end of the insulating channel and sockets are formed in the flange thickened portion for carrying a quick-connect device which is generally U-shaped with slots in the legs adapted to engage coil end-wires when the device is forced into a socket. One end of the device carries a bent-over tongue adapted for locking engagement with the stripped end of an insulated lead-wire. The other end of the device carries a V-shaped camming notch contiguous with and connected to a hole adapted to admit a projecting boss formed at the bottom of each socket for forcing the terminal ends of the one-shot thermal protector carried in the bobbin insulating channel into contact with the sides of the leg slots, the socket walls being slotted for admitting the terminal ends to the sockets.

6 Claims, 17 Drawing Figures

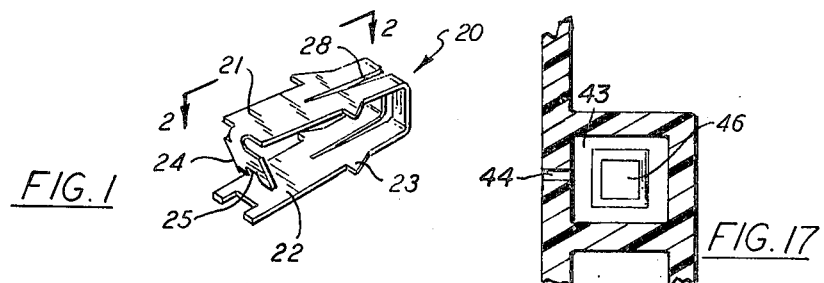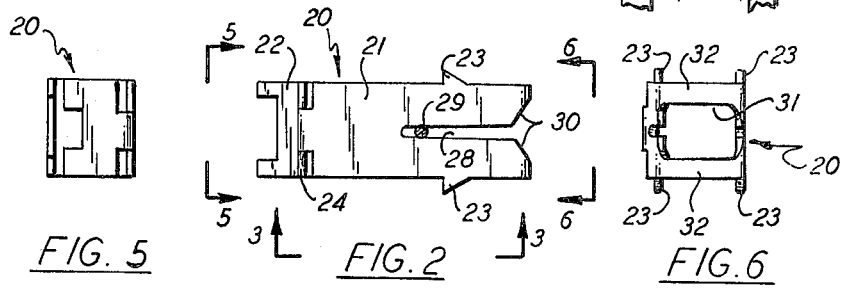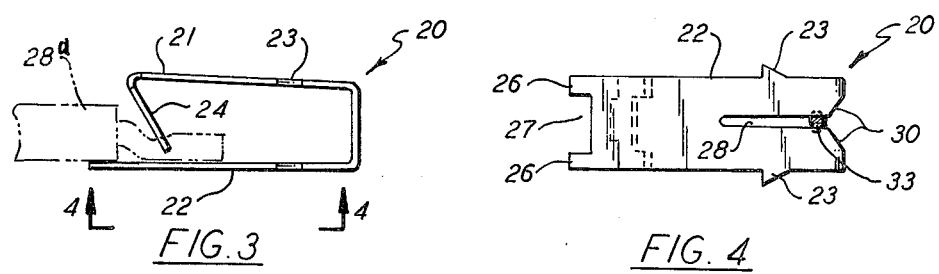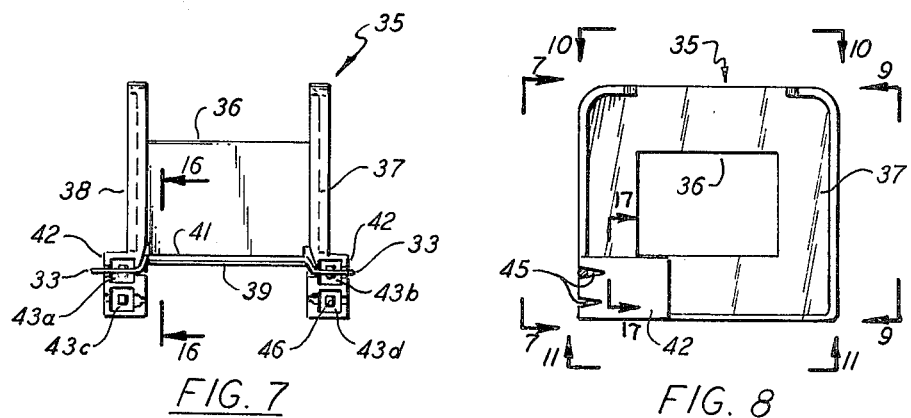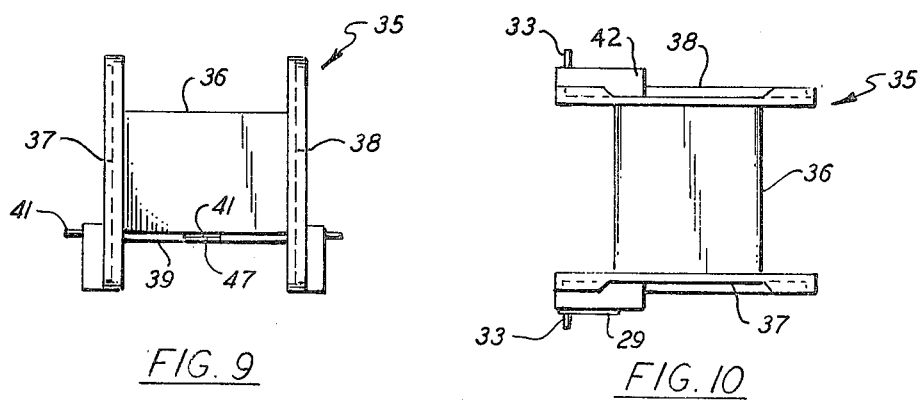

4,132,913

FIELD-COIL BOBBIN WITH BUILT-IN-ONE-SHOT THERMAL PROTECTOR

BACKGROUND OF THE INVENTION

This invention relates generally to a spool or bobbin for supporting a field coil of a small electric motor, the bobbin having an insulating groove in the coil supporting hollow spindle thereof adapted to contain a fuse-type thermal protector or the lead wires thereof, and more particularly to such a device having preformed sockets in the bobbin flanges containing quick connectors for connecting the ends of lead wires with the terminal ends of the thermal protector and for connecting the lead wire ends to the start and end wires of the coil.

Prior art bobbins having built-in thermal protectors associated with the coil wound on the bobbin have the thermal protector inserted while the coil is being wound or inserted in the coil after it has been wound. This leaves the coil with objectionable bulk or may lead to destruction of the coil wire while inserting the protector in the prewound coil.

Such prior art bobbin-contained thermal protectors and terminal connection devices that are housed in the flange of the coil bobbin require objectionably large housings in the bobbin flange or are needlessly complicated and difficult to assemble.

SUMMARY OF THE INVENTION

This invention contemplates an insulating groove along the outside of the spindle portion of a molded plastic-resin field coil bobbin, the spindle being hollow for containing a core portion of the stator which is offset to one side of the rotor-containing portion of the stator. Such a stator and the sub-fractional electric motor of which it forms a part is more fully described in a copending application Ser. No. 692,448, filed June 3, 1976, by Max E. Lautner and Bernard J. West now U.S. Pat. No. 4,071,787.

In the present invention, a portion of each bobbin-flange at each end of the insulating groove is thickened and contains an outwardly opening rectangular tubular socket for housing a quick-connect device readily obtainable from the former Aircraft Marine Products Company, now AMP Corporation having offices at P.O. Box 3608, Harrisburg, Pa. 17105. Each socket has at the center of its bottom an integral rectangular camming boss for forcing the terminal ends of a one-shot thermal protector located in the insulating groove with its ends located in the sockets into gripping engagement with the sides of slots in the quick connect device forced into the socket.

Each socket wall is provided with a relatively short groove on the outside face of the thickened portion of the flange extending lengthwise of the socket for containing the end of a wire in the socket, and each socket wall is provided with a relatively long slot extending lengthwise of the socket on the inner surface of the socket wall extending at least as far as the insulating groove, for admitting a terminal end of a thermal protector into the socket or admitting the terminal end of a coil lead wire when the coil is wound on the bobbin.

The thickened portion of each bobbin flange also preferably is provided with another socket outward of and like those at either end of the insulating groove.

Each quick-connect device has a generally U-shaped configuration with one leg shorter than the other, the shorter leg having an end tongue bent toward the other leg at an angle of more than 90° and projecting diagonally across toward the closed end of the U. The inner end of the tongue has a central recess adapted to engage a stripped end of a coil terminal wire when the stripped end is inserted in the device after it is forced into the rectangular tubular socket.

Each leg of the quick-connect device is slotted at its center for about half the length of the device from the closed or bottom end of the device. These slots have a very slight taper outward toward the closed end for engaging with a coil end wire when the device is forced into the socket. Each slot terminates in and connects with a rapidly outwardly flaring V-slot adjacent the closed end, the V-slot wider end terminating in and connecting with a hole in the closed end of the device for cooperating with the camming boss at the bottom of the socket.

One outer side of the rectangular-tubular spindle of the bobbin is thickened along a corner extending between the sockets at the end of the insulating groove providing a thickened portion of the spindle in which the rectangular insulating groove lies. A fuse wire may be used as the thermal protector, one end lying in each of the sockets and passing through the comparatively long slots in the inner bobbin-flange wall and the length of fuse wire between the ends being forced down into the insulating groove.

The outer portion of the spindle thickened portion is very thin and provides a lip overlying the outer side of the groove. When the field coil is wound on the bobbin spindle, although the field coil wire is very fine it draws this lip down over the outer open side of the groove providing means for retaining and insulating the fuse wire in the insulating groove.

The thickened spindle portion has a rectangular depression midway between bobbin flanges in which a known one-shot or fuse type thermal protector may be inserted and secured as by adhesive. The rectangular depression is as deep as the unthickened spindle portion on that side and extends as far as the insulating slot. Lead wires from this one shot protector can therefore be led into the insulating slot under its overlying lip portion and then be lead through either end of the insulating slot and through the longer slots in the inside wall of the bobbin flanges into the sockets at either end for engagement with the quick connection device exactly like the fuse wire protector.

It will be understood that the stripped end of an insulated lead wire and a terminal end of a one shot thermal protector may be secured to the quick connect device in the socket at one end of the insulating groove and a coil end wire and the other terminal end of the one shot protector secured to the quick-connect device in the socket at the opposite end of the insulating slot. The stripped end of the other coil lead wire may be secured to a quick-connect device in another one of the other two sockets, the other coil end wire being secured to the same device. It will also be understood that the fourth socket may have a quick-connect device therein when the fourth socket is used with a two stage winding as, for example, a winding having a separate starting coil and a full field coil.

BRIEF DESCRIPTION OF THE DRAWINGS

FIG. 1 is a perspective view of a quick-connect device viewed from above and one side;

FIG. 2 is a plan view thereof as viewed in the direction of arrows 2—2 of FIG. 1;

FIG. 3 is a side elevational view thereof as viewed in the direction of arrows 3—3 of FIG. 2, an insulated terminal wire end being fragmentarily shown in broken lines in engagement with the device;

FIG. 4 is a bottom plan view thereof as viewed in the direction of arrows 4—4 of FIG. 3, a fuse terminal wire being shown in section in engagement with one end of the device;

FIG. 5 is an end elevational view thereof as viewed from the left in FIG. 2;

FIG. 6 is an end elevational view thereof as viewed from the right in FIG. 2;

FIG. 7 is a front elevational view of a bobbin for use with the quick connect device of FIG. 1, a fuse wire being shown therewith;

FIG. 8 is an end elevational view thereof as viewed from the right in FIG. 7, the opposite end being a mirror image thereof;

FIG. 9 is a rear elevational view thereof;

FIG. 10 is a top plan view thereof;

FIG. 17, on sheet 1 of the drawings, is an enlarged fragmentary sectional view on the line 17—17 of FIG. 8.

DESCRIPTION OF THE PREFERRED EMBODIMENTS

Figure 11:
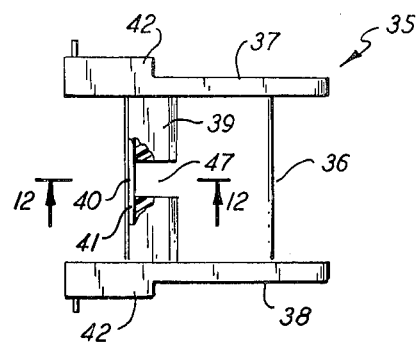
FIG. 11 is a bottom plan view thereof, portions being cut away to show the fuse wire in the channel provided therefor.

Referring first to FIGS. 1–6, a quick-connect device 20 is shown. The device is shown enlarged about 5 to 1 in the original patent drawings before the necessary reduction in size before printing the patent, being about 11/32 inches long and about ⅛ inch square in the other two dimensions. Arrows in FIGS. 1, 2 and 3 indicate the direction of viewing of the other figures according to the figure numbers adjacent the arrows.

The device 20 is generally U-shaped, having legs 21 and 22, leg 22 being slightly longer than leg 21. The legs are shown as diverging slightly but, being of spring metal, it will be understood they will assume substantial parallelism when forced into the socket provided for the device in the bobbin hereinafter described.

Each leg 21 and 22 is provided on each side with a pointed retaining ear 23, as best seen in FIGS. 2 and 4. The side of each ear 23 advancing first toward its socket is tapered back toward the sharp point of the ear, the other side of the ear being substantially normal to the edge of its respective leg, as is usual in such devices.

The left end, as viewed in FIG. 1, is referred to hereinafter as the open end and the right end is referred to as the closed end, the base of the "U," although such terms may be said to be not strictly accurate. Leg 21 at its left end, as best seen in FIG. 3, is provided with a bent over tongue 24 which is bent back past the normal to an angle of about 30° to leg 21, angularly projecting toward the closed end.

As best seen in FIG. 1, tongue 24 at its extremity is centrally notched back to a contact edge 25 between two projections similar to the projections 26 on either side of notch 27 shown in FIG. 4 at the open end of leg 22. Also indicated in broken lines 28a in FIG. 3 is the stripped end of an insulated lead wire for the field coil. This indicates how the contact edge 25 may be locked against the stripped end by forcing the lead wire into the device 20 after it has been forced into its socket for retaining the lead wire.

As best seen in FIGS. 2 and 4, each of the legs 21 and 22 is provided with identical, longitudinally extending, centrally located slots 28 extending from the closed end for about half the length of device 20. These slots are very slightly tapered outwardly toward the closed end and, as indicated in FIG. 2, are adapted to receive and make electrical contact with a coil end wire shown in section at 29.

Each slot 28 terminates in and is connected with a larger and outwardly flaring V-shaped camming slot 30, as shown in FIGS. 2 and 4. The outwardly tapering camming edges at 30 terminate at the closed end in a hole 31 through the closed end leaving, on either side of the hole, the two strips 32 constituting the closed end, as shown in FIG. 6. The purpose of the camming edges 30 and the hole 31 are for guiding certain wires into the slots 28 as, for example, so as to admit a terminal end of a fuse wire, shown at 33 in section in FIG. 4 and hereinafter more fully described, into electrical engagement with device 20 at the slots 28.

As shown at 29, 28a and 33, respectively, in FIGS. 2, 3 and 4, the quick-connect device 20 is adapted to make electrical contact with wires of three different diameters, the stripped end of the coil lead wire being the largest and the coil end wires the smallest.

Referring now to FIGS. 7–11 inclusive, a bobbin 35, for incorporating the quick-connect device 20 described above, is shown, the direction of viewing of the various Figures being shown by arrows in FIG. 8, the numerals adjacent the arrows indicating the pertinent Figure numbers. The bobbin 35, shown in the original patent drawings before reduction in size in printing, is life size or about 1⅝" × 1¾" × 1 9/16" over-all. The bobbin is of a molded plastic resin having good electrical insulation characteristics and has a hollow spindle portion 36, rectangular in cross section, and having integral flanges 37 and 38 at respective ends of the spindle.

Figure 12:
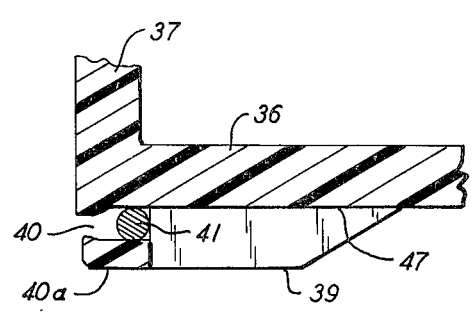
FIG. 12 is an enlarged fragmentary sectional view on the line 12—12 of FIG. 11.

As best seen in FIGS. 7, 9 and 11, spindle 36 has an externally thickened portion 39 along one edge or corner thereof. As shown in FIG. 11, and best seen in the fragmentary enlarged, sectional view of FIG. 12, a substantially rectangular groove 40 is formed along this same spindle corner and a fuse wire 41 is inserted in the groove 40 to serve as a one-shot thermal protector. It will be noted that groove 40 has a comparatively thin lip 40a forming the outer surface of spindle 36 over the groove 40.

As shown in FIGS. 7, 8 and 11, each flange 37 and 38 is thickened at 42 and outwardly opening sockets, 43a, 43b, 43c and 43d, substantially rectangular in cross section, are formed in these thickened portions, as shown in FIG. 7. Sockets 43a and 43b are in opposite flanges and lie substantially at the ends of the groove 40, sockets 43c and 43d being adjacent the first pair but outward from the spindle.

Figure 16:
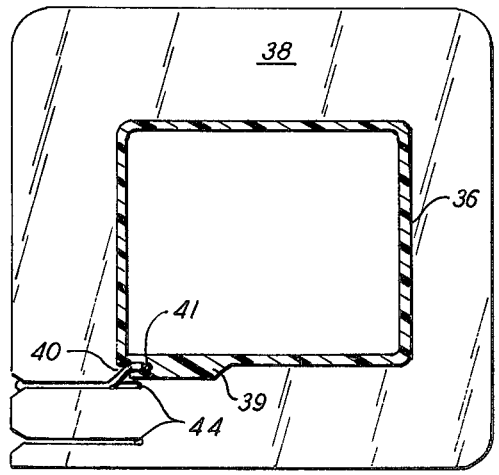
FIG. 16 is an enlarged sectional view on the line 16—16 of FIG. 15.

Each socket 43 has a comparatively long groove 44, lengthwise of the socket, through the socket wall on the inner face of flange 37 or 38, extending to the groove 40 in the spindle from the outer edge of the flange, as best seen in the enlarged, sectional view of FIG. 16. Each socket also has a comparatively short groove 45 through the wall thereof opposite the groove 44 in the wall on the outer surface of the thickened portion 42 of its respective flange, as best seen in FIG. 8.

Each socket 43 has a cross-sectional dimension slightly larger than that of the device 20 at its closed end so that the device is constricted to the dimensions of the socket when it is placed in the socket, closed end first, and thereafter forced into the socket. The depth of each is substantially greater than the overall length of device 20.

As shown in FIG. 7, and better seen in the enlarged, fragmentary, sectional view of FIG. 17, each socket has an outwardly projecting camming boss 46 in the center of its bottom or closed end.

When device 20 is placed in a socket the slots 28 in the legs 21 and 22 are aligned with slots 44 and 45 of the socket. Thus when the end of a coil end wire is held in slots 44 and 45 the end wire is received in slots 28 and forced toward the narrower end thereof, when the device 20 is forced into a socket, into good electrical contact as shown in FIG. 2.

In operation, when a fuse wire 41 is placed within the groove 40, one end 33 of the wire 41 extends through groove 44 into socket 43a, for example. The wire extends through the socket and out through groove 45, as shown in FIG. 8. The closed end of the device 20, as shown in FIG. 6, is then inserted in the open end of socket 43a and forced down into the socket by an appropriate plunger, not shown. The sides of the V-shaped notch, FIG. 4, of the device forming the camming surfaces 30, center the wire 41 against the open ends of slots 28. As device 20 is forced into socket 43a, the end of wire 41 in the socket is carried down to the camming boss 46 at the bottom of the socket and forced against the open end of one or both slots 28 forcing the fuse wire 41 against the end of a slot and the slot sides compressing or cutting into wire end 33, as shown in FIG. 4.

Similarly, the other end 33 of fuse wire 41 in socket 43b is then electrically connected to another device in the same manner. Since it is desired that the end 33 in socket 43b be also connected to a start wire 29 (FIG. 2), such a start wire is placed through slots 44 and 45 of socket 43b outwardly from wire end 33 prior to forcing device 20 into the socket, the end wire 29 of the coil being forced into slots 28 of the device as described above.

Referring to FIG. 10 one end 33 of a fuse wire is shown projecting from the thickened portion 42 of flange 38. In FIG. 10, a coil start wire is also shown emerging from a slot 45 in flange 37 but turned down against the thickened portion of flange 37. Since the coil end wire 29 first meets the closed end of device 20 it is first engaged by the slot 28 of the device and is forced into the slot 28. The slot 28 next engages the end 33 of the fuse wire which is drawn down into socket 43b. The smaller start wire 29 may be held against the outer surface of flange 37 to ensure its tensioning while forced into slot 28. The end 33 of the fuse wire is free to be drawn down into the socket.

After the coil has been wound, the other end wire of the coil, the finish wire, is then similarly connected to the slots 28 of a device 20 forced into a third socket such as 43c or 43d. The stripped ends of the lead wires are then forced under the tongue 24 of the device 20 in the sockets, such as socket 43a and socket 43c or 43d, designated to receive them. It will be understood that when multistrand lead wires are used, the stripped end of the lead wire is first tinned so that it will force its way into the slot 25 of the respective device 20.

Where the coil has two parts, such as a start coil and a run coil, the other socket 43c or 43d may be used, the device therein being connected to another coil end wire as described above and the appropriate lead wire is then inserted.

Referring to FIG. 11, bobbin 35 is preferably provided with a rectangular opening 47 in the thickened portion 39 of spindle 36 for a purpose hereinafter described.

Figure 13:
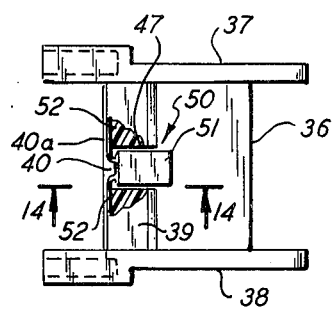
FIG. 13 is a view similar to FIG. 11 but in combination with a thermal protective device having terminal wires lying in the insulating channel of FIG. 11.
Figure 14:
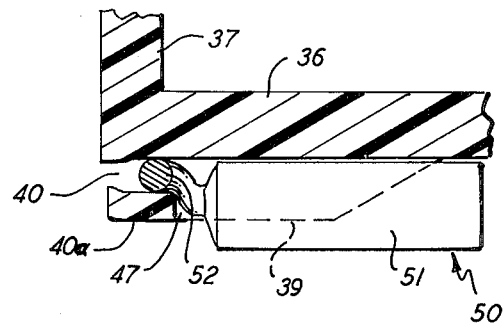
FIG. 14 is an enlarged fragmentary sectional view on the line 14—14 of FIG. 13.
Figure 15:
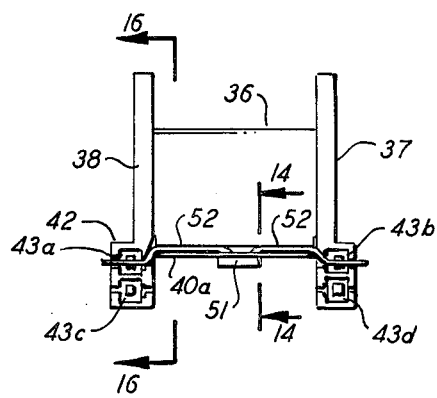
FIG. 15 is a front elevational view similar to FIG. 7 of the bobbin and thermal protector combination of FIG. 13.

While the wire 41 in groove 40 is described as a fuse wire which melts when the coil is overheated, other very small one-shot fuse protectors exist such as that shown in FIGS. 13-15 inclusive. Such a one-shot thermal protector 50 has a body 51 containing a material which, when overheated, deteriorates or melts and thus breaks a circuit therethrough between its terminal lead wire portions 52,52 which are of copper. The body 51 may be secured as by adhesive in the rectangular opening 47 in the thickened portion 39 of the spindle, as shown in FIG. 13. The opening 47 extends as far as the insulating groove 40, as shown in FIG. 14, so that the lead wires 52 may be inserted directly into groove 40 from the end of opening 47 and then bent over into groove 40 in either direction toward the flanges 37 and 38, respectively, and like fuse wire 41, extending into sockets 43b and 43a through respective slots 44 and 45 of the sockets, as shown in FIG. 15.

It will be noted that the thickness of body 51 of the one-shot thermal protective device 50 exceeds by very little the depth of opening 47 so that when the coil is wound on spindle 36 the resulting coil is disturbed only minimally and little enlargement of the coil results. Body 51, containing the meltable substance is closely surrounded by the turns of wire making up the coil and is readily heated by any over-heating of the coil. The lip 40a is bent down by the coil wire wound around it thus confining and insulating lead wire portions 52,52 in the groove 40.

While the full length of the fuse wire device 41 between sockets 43a and 43b is susceptible of being melted by overheating of the coil wound around it and only the body portion 51 of the device 50 is so susceptible, both are one-shot thermal protectors and the groove 40 is capable of containing the terminal ends of either of such one-shot thermal protectors. Lead wire portions 52 of the device 50 are usually of substantially the same diameter as or smaller than the fuse wire device 41, as shown.

It will be understood that the fuse wire 41 may be of different diameters according to the motor requirements of the motor with which bobbin 35 is used. For most such small motors, usually fan motors, the fuse wire diameter is sufficiently small as to be forced into groove 28 of device 20 as shown at 33 in FIG. 4. It may be that motor requirements require a larger wire size in which only a portion of the wire end 33 is forced into groove 28 and in such cases the contact of the fuse wire end with device 20 is maintained by the continued pressure of camming boss 46 against the fuse wire, the device 20 being secured in its respective socket by the ears 23.

We claim:

1. A bobbin for supporting an electric motor field coil comprising a spindle on which the coil wire is wound and integral flanges at each end of the spindle, the bobbin being molded from a plastic resin material having good electric insulating characteristics, an outwardly opening groove being formed in the spindle and extending lengthwise thereof, the groove being narrowly spaced from the outer surface of the spindle, a one-shot thermal protector having terminal wires lying in the groove, and connecting means associated with each flange for electrically connecting one end of the terminal wires to an insulated lead wire to the coil and securing it to the flange and for electrically connecting the other end of the terminal wires to a start wire of the coil when it is wound on the spindle.

2. The bobbin as defined in claim 1 wherein the terminal wires comprise a single length of fuse wire.

3. The bobbin as defined in claim 1 wherein the terminal wires comprise separate wires leading from a thermal protector body, the body being secured in a recess in the spindle extending toward and opening into the groove.

4. In a bobbin for supporting a field coil for a small electric motor, a bobbin spindle having an integral flange at each end thereof, the spindle and flanges being of molded plastic resin material having good electrical insulation characteristics, the spindle having an outwardly opening insulating groove formed therein extending from one flange to the other, the groove being narrowly spaced from the outer surface of the spindle, the groove being rectangular in cross section and having a thin outer lip along the groove opening, a fuse wire thermal protector lying in the insulating groove, means at each end of the fuse wire and associated with a respective flange for connecting the fuse wire in a circuit through a coil wound on the spindle for protecting the coil from damage from overheating, the coil windings drawing the thin outer lip down over the opening of the insulating groove for securing and insulating the fuse wire in the groove.

5. In a bobbin for supporting a field coil for a small electric motor, a bobbin spindle having an integral flange at each end thereof, the spindle and flanges being of plastic resin material having good electrical insulation characteristics, the spindle having a thickened portion therealong containing an outwardly opening insulating groove therein extending from one flange to the other, the groove being rectangular in cross section and having a thin outer lip along the groove opening, the spindle thickened portion having a depressed rectangular opening extending to and connected with the insulating groove, a one-shot thermal protector secured in the rectangular opening and having terminal lead wire portions thereto lying in the insulating groove and extending respectively to each flange, means at the end of each terminal lead wire portion and associated with a respective flange for connecting the terminal protector in a circuit through a coil wound on the spindle for protecting the coil from damage from overheating, the coil windings drawing the outer lip down over the opening of the insulating groove for securing and insulating the terminal lead wire portions in the groove.

6. In a bobbin for supporting a field coil for a small electric motor, a bobbin spindle having an integral flange at each end thereof, the spindle and flanges being of molded plastic resin material having good electrical insulation characteristics, the spindle being hollow and having a thickened portion therealong containing an outwardly opening insulating groove, the groove extending from one flange to the other, the groove being rectangular in cross section and having a thin outer lip along the groove opening, a one shot thermal protector having terminal wires at each end lying in the insulating groove, each flange having a thickened portion at the end of the insulating groove, each flange thickened portion having an outwardly opening socket therein extending at least to the end of the insulating groove, each socket having a slotted wall adjacent the insulting groove for admittng an outer terminal end portion of the terminal protector terminal wires into the socket, each socket containing therein means for connecting the outer terminal end portions to another wire of the field coil when the wire field coil has been wound on the spindle between the bobbin flanges, the thin outer lip along the insulating groove being sufficiently flexible to be drawn down by the field coil wire as it is wound for retaining the terminal wire ends in the groove.

* * * * *

UNITED STATES PATENT AND TRADEMARK OFFICE
CERTIFICATE OF CORRECTION

PATENT NO. : 4,132,913

DATED : January 2, 1979

INVENTOR(S) : MAX E. LAUTNER & THOMAS J. FLINT

It is certified that error appears in the above-identified patent and that said Letters Patent are hereby corrected as shown below:

In Claim 6, Col. 8, line 38, "terminal protector" should be -- thermal protector --.

Signed and Sealed this

Seventeenth Day of April 1979

[SEAL]

Attest:

RUTH C. MASON
Attesting Officer

DONALD W. BANNER
Commissioner of Patents and Trademarks